United States Patent [19]

Kraus

[11] Patent Number: 5,297,322
[45] Date of Patent: Mar. 29, 1994

[54] CONNECTION BETWEEN A SUPPORT AND A PLATE ELEMENT

[75] Inventor: Willibald Kraus, Grunstadt, Fed. Rep. of Germany

[73] Assignee: TRW United Carr GmbH & Co. KG, Enkenbach-Alsenborn, Fed. Rep. of Germany

[21] Appl. No.: 971,298

[22] Filed: Nov. 4, 1992

Related U.S. Application Data

[63] Continuation-in-part of Ser. No. 695,616, May 3, 1991, Pat. No. 5,106,223.

[30] Foreign Application Priority Data

Nov. 5, 1991 [DE] Fed. Rep. of Germany ....... 4136422

[51] Int. Cl.⁵ .................. A44B 17/00; F16B 21/00
[52] U.S. Cl. ........................ 24/662; 24/297; 24/614; 403/11; 411/508
[58] Field of Search .................. 24/662, 614, 683, 324, 24/297, 453; 411/908, 508, 509, 510, 437; 403/11, 405.1

[56] References Cited

U.S. PATENT DOCUMENTS

| | | |
|---|---|---|
| 3,248,995 | 5/1966 | Meyer .................. 24/297 |
| 3,916,756 | 11/1975 | Yoda .................. 24/683 |
| 4,579,493 | 4/1986 | Schaty .................. 411/908 |
| 4,859,129 | 8/1989 | Kraus .................. 24/662 |
| 4,999,019 | 3/1991 | Kraus .................. 411/437 |
| 5,098,242 | 3/1992 | Schaty .................. 411/437 |
| 5,106,223 | 4/1992 | Kraus .................. 403/11 |
| 5,143,500 | 9/1992 | Schuring et al. .................. 411/508 |

*Primary Examiner*—Victor N. Sakran
*Attorney, Agent, or Firm*—Fay, Sharpe, Beall, Fagan, Minnich & McKee

[57] ABSTRACT

The invention relates to a connection assembly between a support, for example a body part of an automotive vehicle, and a plate element, such as a wall covering, including a lower holding component insertable into an opening of the support. The lower holding component carries a center component whose upper portion comprises a spherical segment which can be clipped into an opening in a tubular section of upper component. The opening which receives the spherical segment has an internal prof ile defined by spring elements spaced about the interior of the tubular section. The spring elements hook behind the spherical segment, and between the spring elements there are arranged spacer elements acting upon the spherical segment to maintain it centered relative to the spring elements.

11 Claims, 1 Drawing Sheet

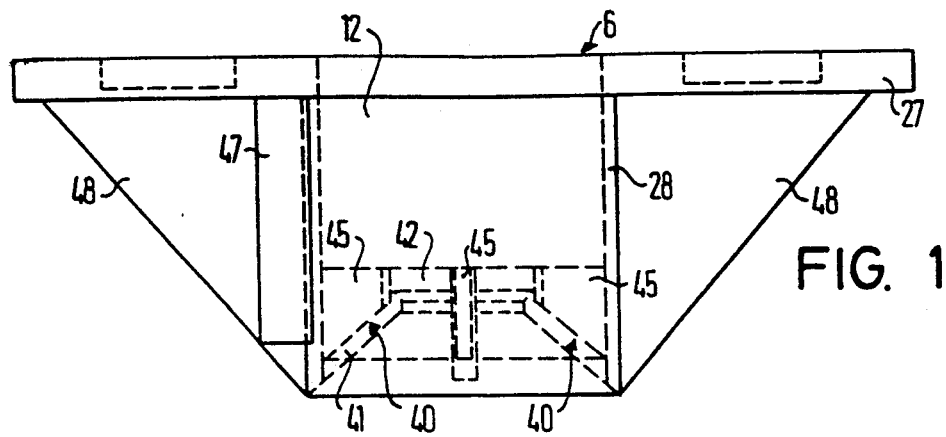
FIG. 1
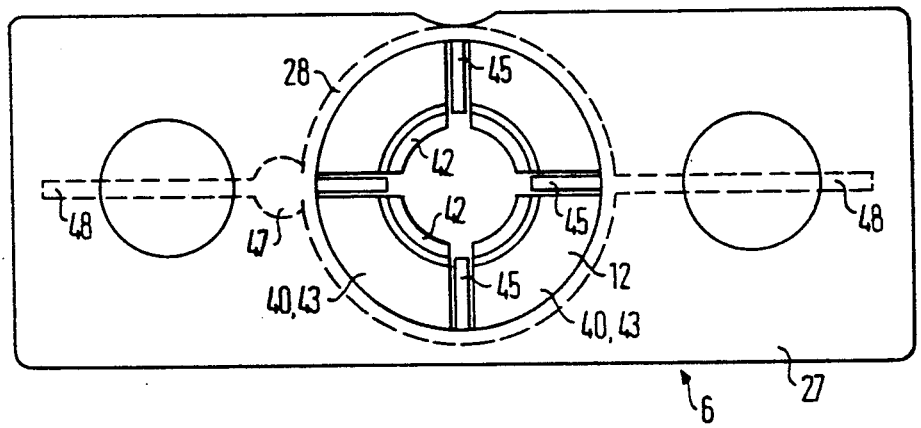
FIG. 2
FIG. 3
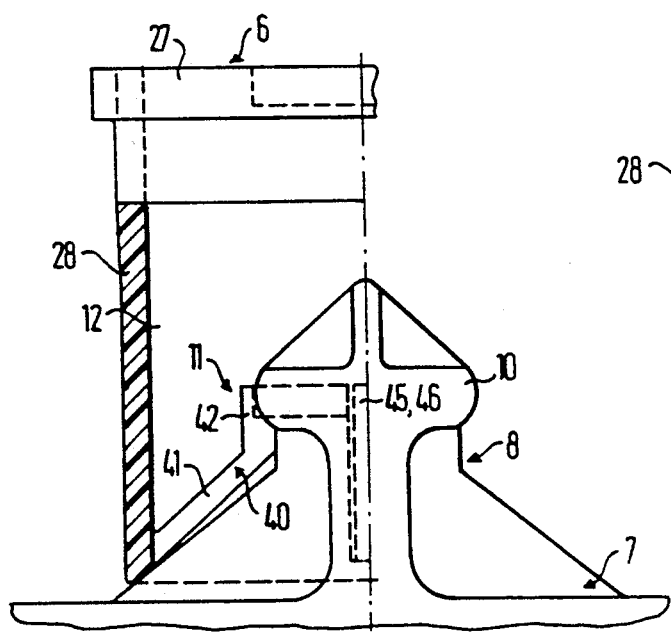
FIG. 4
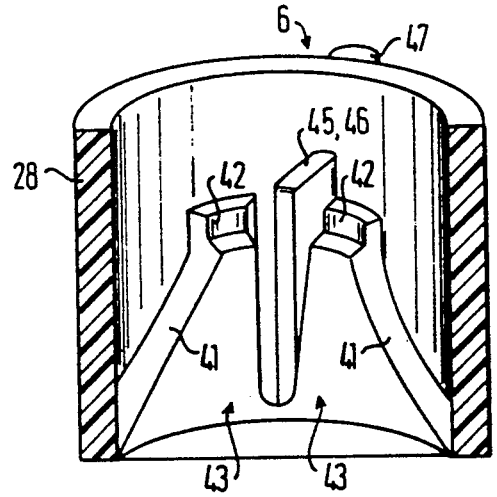

CONNECTION BETWEEN A SUPPORT AND A PLATE ELEMENT

The subject application is a continuation-in-part application of U.S. application Ser. No. 695,616, filed May 3, 1991 for "Connection Assembly for Use Between a Support and a Plate Element", and now U.S. Pat. No. 5,106,223, issued Apr. 21, 1992.

BACKGROUND OF THE INVENTION

The subject invention is directed to a connection arrangement for joining a plate or wall element to a support base or frame.

The invention is especially suited for use in the motor vehicle art for joining a wall panel or covering to a body frame or base component and will be described with particular reference thereto; however, the invention is capable of broader application and could be used for joining similar structural elements in other environments.

In my prior U.S. Pat. No. 5,106,223 which is incorporated herein by reference, there is shown and described a connection arrangement for the noted purposes which includes a molded plastic, lower holding element that is connectable into an opening in the support frame. The lower holding element carries a head piece having spherical segmented form which clips into a correspondingly profiled opening in a tubular section of an upper connecting element that joins to the wall panel or covering. Preferably, the head piece of spherical segmented form is on an intermediate element which allows lateral adjustment to take place to compensate for misalignment between the lower holding element and the upper holding element.

The subject invention has as its primary objective the improvement of the connection between the upper element and the spherical segment head piece of the center component in such a manner that, on one hand, easy installation is achieved, while on the other hand, high withdrawal forces must be applied in order to separate the connection.

SUMMARY OF THE INVENTION

According to the invention, the noted objective is achieved in that the prof iled opening which receives the head piece has several spring elements distributed about the circumference of the opening to hook behind the spherical segment of the head piece. Between the spring elements there are arranged spacer elements in the form of axially extending ribs which at least partially act upon the spherical segment. This results in the advantage that due to the interaction of the spring elements and the spacer elements, the spherical segment of the center component is embedded functionally secure in the tubular segment of the upper part even when high withdrawal forces are applied. on the other hand, however, installation is easily and quickly realizable. The spring elements, in such an arrangement, can each comprise a resilient zone and a terminal L-shaped zone adjacent thereto. The L-shaped zone serves for the embedding of the spherical segment.

In a further ref inement of the invention, the resilient zone of the spring elements may be designed as part of a conical casing whose largest diameter is connected to the opening of the tubular section. This produces, in a simple fashion, a highly effective spring element which, with its L-shaped zone, anchors the spherical segment head piece in the upper zone.

In a still further refinement of the invention, the spacer elements may be arranged between each spring element to form a cross piece. The cross piece is arranged at the inner circumference of the tubular element whereby the spacing between opposing cross pieces is adjusted to correspond to the outer diameter of the spherical segment. Furthermore, the height of the cross piece extends at least up to the area of the spherical segment, but it may, however, also extend over the entire tubular segment. Thus, the tubular segment is anchored functionally secure in the upper part, so that even with lateral forces applied upon the center piece, the spherical segment cannot be displaced within the upper part. Thus, despite the spring elements, excellent centering is achieved by means of the cross pieces.

In a still further refinement of the invention, four of the spring elements are provided with interpositioned spacer elements. Additionally, the cross pieces are adjusted in the lower zone to correspond to the exterior circumference of the conical casing and may be designed with a beveled lower surface to correspond to the shape of the conical casing.

In order to facilitate installation, the exterior circumference of the tubular segment may have a radially extending stop cam to facilitate sorting for automatic insertion. This basically prevents erroneous positioning vis-a-vis the support during assembly.

BRIEF DESCRIPTION OF THE DRAWINGS

The above advantages will become apparent from the description which fallows when read in conjunction with the accompanying drawings wherein:

FIG. 1 is a side elevational view of the upper component of the connector assembly;

FIG. 2 is a top plan view of the component shown in FIG. 1;

FIG. 3 is an end elevational view of the connection assembly shown partially sectioned with portions broken away to more clearly show the relationship between the spherical segment form of the head piece and its connection to the upper component of FIG. 1; and, FIG. 4 is a perspective sectional view of the tubular segment of the component of FIG. 1.

DETAILED DESCRIPTION OF THE PREFERRED EMBODIMENT

Referring more particularly to the drawings wherein the showings are for the purpose of illustrating a preferred embodiment of the invention only and not for the purpose of limiting same, FIGS. 1 and 2 show an upper component 6 which is arranged to be attached through the use of a plate 27 to a wall panel or covering of a vehicle body part. The plate 27 can be joined to the associated panel or covering by adhesive bonding, mechanical fasteners, or the like. The component 6 further comprises a tubular lower connecting segment 28. Between the tubular segment 28 and the plate 27 are angular reinforcement cross pieces 48 which are generally located to extend perpendicular from plate 27 along diametrically opposite sides of the tubular segment 28. At the exterior circumference of the tubular segment 28, there is a stop cam element 47 which functions for facilitating sorting and allowing automatic insertion apparatus to correctly position the upper part 6 vis-a-vis the support element, which is not shown.

At the inner circumference of the tubular segment 28, there is provided a counter profile that is comprised of several spring elements 40 which are located in spaced relationship about the inner circumference of the opening 12. Between each of the spring elements 40, there are located, as shown in FIG. 4, individual spacer or rib-like elements 45 which are designed in the form of radially inward extending cross pieces 46. In the embodiment shown, the cross pieces 46 are in diametrically opposed, aligned relationship and are evenly spaced about the circumference.

The spring elements 40 are respectively comprises of a resilient zone in the form of an angularly related arm section 41 and an upwardly extending, terminal end portion having an L-shape portion 42 connected thereto. As is apparent from FIG. 3, the L-shaped portion 42 is arranged to engage and act upon a head piece 10 in the upper area 8 of center piece 7. As illustrated, the L-shaped portions hook behind and engage under the spherical segment 10. In the arrangement shown, the resilient arm or zone 41 is designed as part of a generally conically shaped casing 43. The largest diameter of the conical casing 43 is connected with the opening 12 of the tubular-shaped segment 28 at its open lower entry end which defines an insertion zone.

Thus, as can be seen, the spherical segment 10 of the upper area 8 of the center piece 7 can be inserted from below into the opening 12 of the tubular segment 28 of the upper component 6. During this insertion, the spring arm 41 spring back out of the way to allow entry of the spherical segment 10. The arms 41 return to their original position only when the spherical segment 10 is fully embedded in the L-shaped portions 42 of the spring elements 40 as seen in FIG. 3. In this position, the innermost edges or frontal sides of the cross pieces 46 act upon the exterior circumference of the spherical segment 10. Thus, when it is in its installed position, the spherical segment 10 is functionally securely embedded in the upper part 6. Should a lateral displacement force act upon the center piece 7 or the upper piece 6, the displacement force is absorbed by the cross pieces 46 so that the spring elements are not affected and retain their locking positions.

It is apparent from FIGS. 1 and 2 that four of the spring elements 40 with their inner position spacer elements 45 may be arranged in the tubular section 28. In such an arrangement, as shown in FIG. 4, there is always arranged between each two spring elements 40 a single spacer element 45 having the form of a cross piece 46. The length of each cross piece 46 is adjusted to the outer diameter of the spherical segment 10 and extends radially from the inner circumference of the tubular segment 28. The vertical height of the cross piece 46 must extend at least to the spherical segment 10 (see FIG. 10). It can, however, extend upwardly throughout the entire length of tubular segment 28 if desired.

Additionally, it is desirable that the cross pieces 46 have their lower edges shaped and formed in a beveled configuration to generally correspond to the beveled shape of the exterior contours of the center piece 7 in the area below the spherical segment 10. This, of course, assures that there will be no interference between the cross pieces 46 and the base of the center piece 7 in the area below the spherical segment 10.

As a result of the design of the spring elements and the cross pieces, there is attained between the upper component 6 and the center piece 7, a high withdrawal force even though installation is easy and quickly realized.

The invention has been described with reference to the preferred embodiment. obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a fastener assembly for connecting between a support base and a plate element, said assembly including a lower holding component insertable into a connecting opening in the support base and equipped with a head piece carrying a spherical segment which is clipped into a fastener opening in a tubular section of an upper holding component, the fastener opening having a counter profile which receives the spherical segment, the improvement wherein the counter profile has a plurality of spring elements distributed about the circumference of the fastener opening and hooking behind the spherical segment, and spacer elements arranged between the spring elements and at least partially acting upon the spherical element to center it between the spring elements.

2. The fastener assembly of claim 1 wherein the spring elements each comprise a flexible arm and an L-shaped portion at an end thereof for engaging the spherical segment.

3. The fastener assembly of claim 2 wherein the resilient arms cooperate and define a conical housing whose largest diameter zone is connected with the opening of the tubular section.

4. The fastener assembly of claim 1 wherein between each spring element there is arranged at least one spacer element.

5. The fastener assembly of claim 4 wherein the spacer elements are positioned to extend radially of the fastener opening in opposing diametrical alignment.

6. The fastener assembly of claim 5 wherein each respective spacer element is arranged at the inner circumference of the tubular section.

7. The fastener assembly of claim 5 wherein the distance between the opposing spacer elements is substantially equal to the outer diameter of the spherical segment.

8. The fastener assembly of claim 7 wherein the axial height of opposing spacer elements is at least up to the spherical segment.

9. The fastener assembly of claim 7 wherein the spacer elements are beveled on their axial lower ends.

10. The fastener assembly of claim 1 wherein there are four spring elements with spacer elements arranged in between.

11. The fastener assembly of claim I wherein there is a stop cam arranged at the exterior circumference of the tubular section.

* * * * *